Oct. 9, 1945.  E. B. THOMPSON  2,386,516
DOLLY
Filed April 27, 1944   3 Sheets-Sheet 1
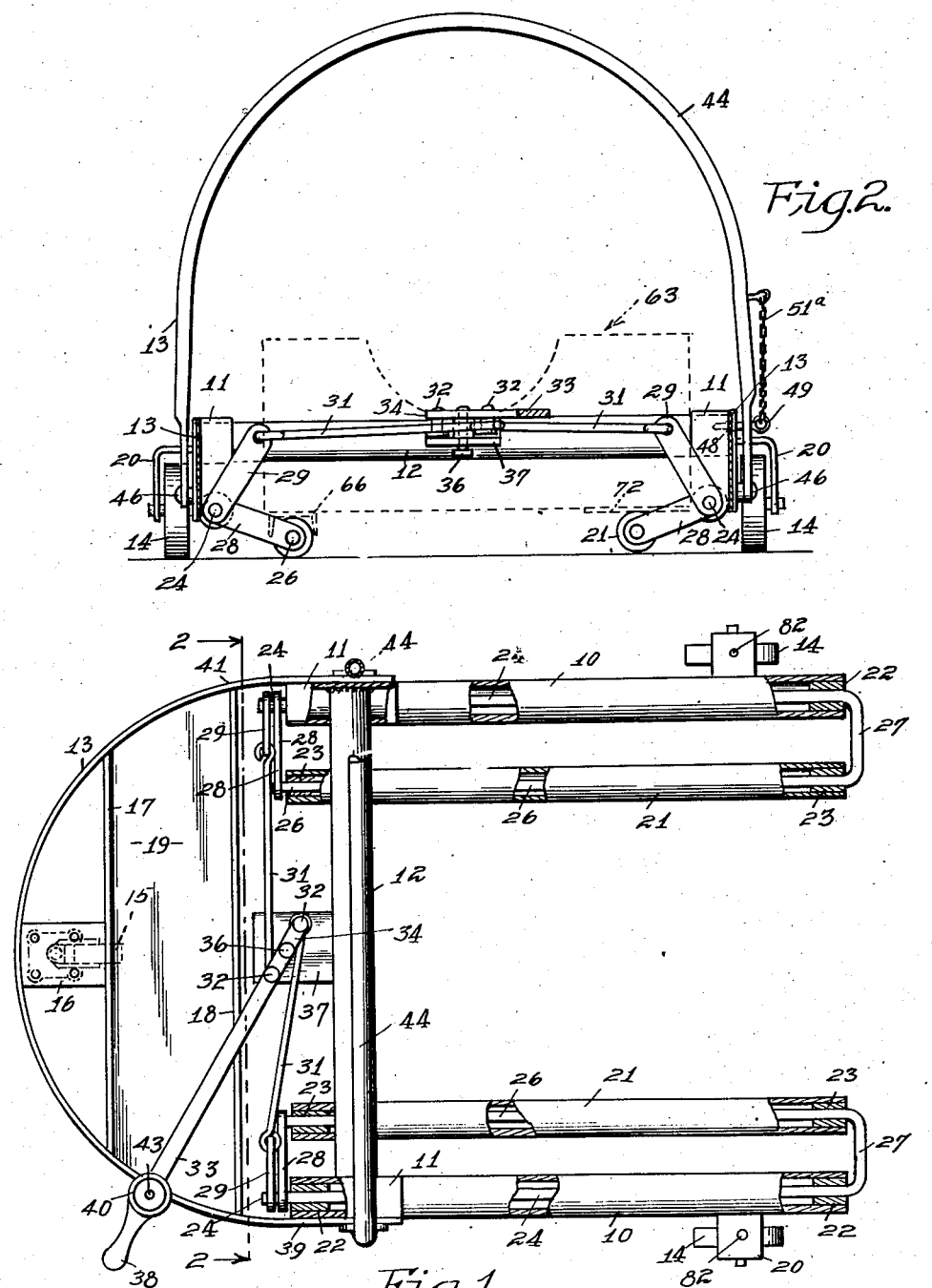

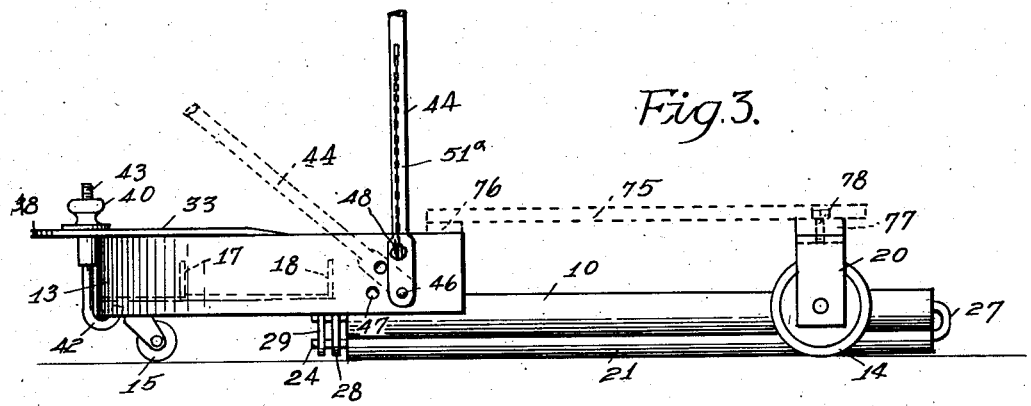
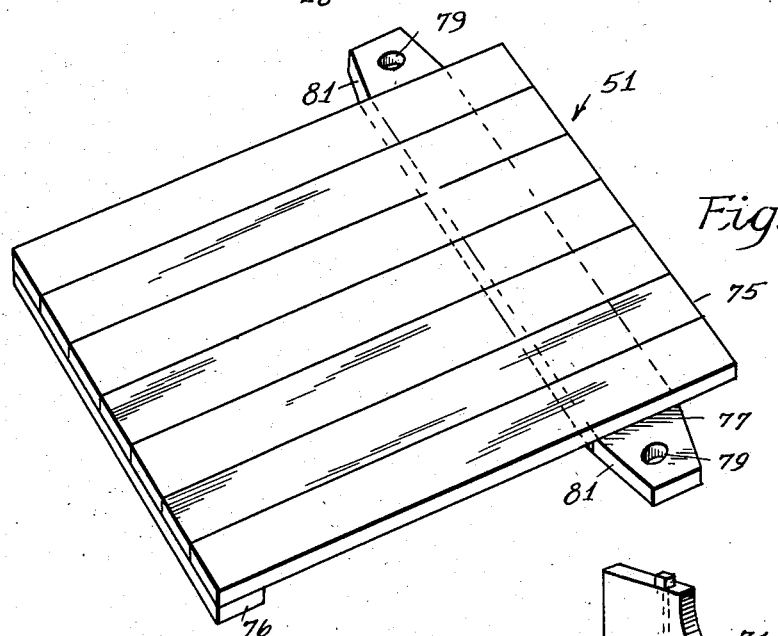
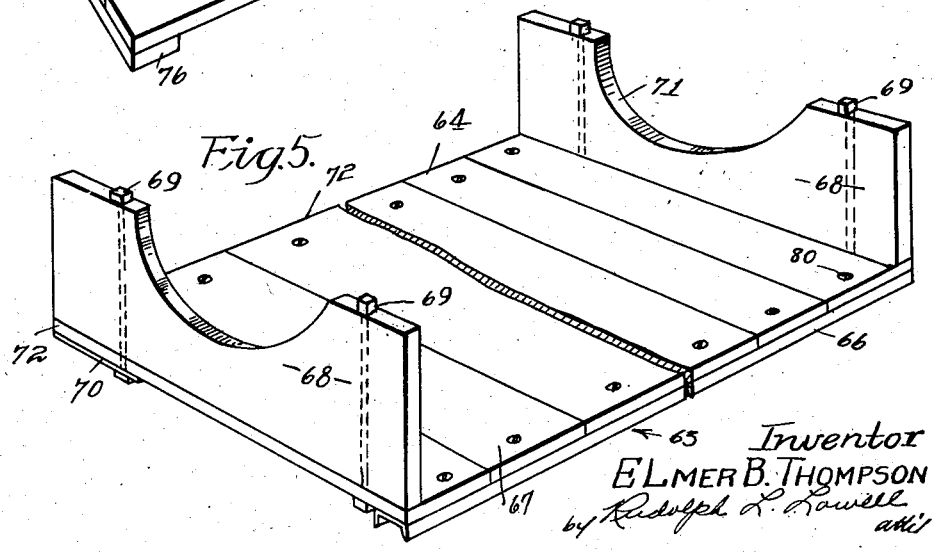

Oct. 9, 1945.  E. B. THOMPSON  2,386,516
DOLLY
Filed April 27, 1944  3 Sheets-Sheet 3
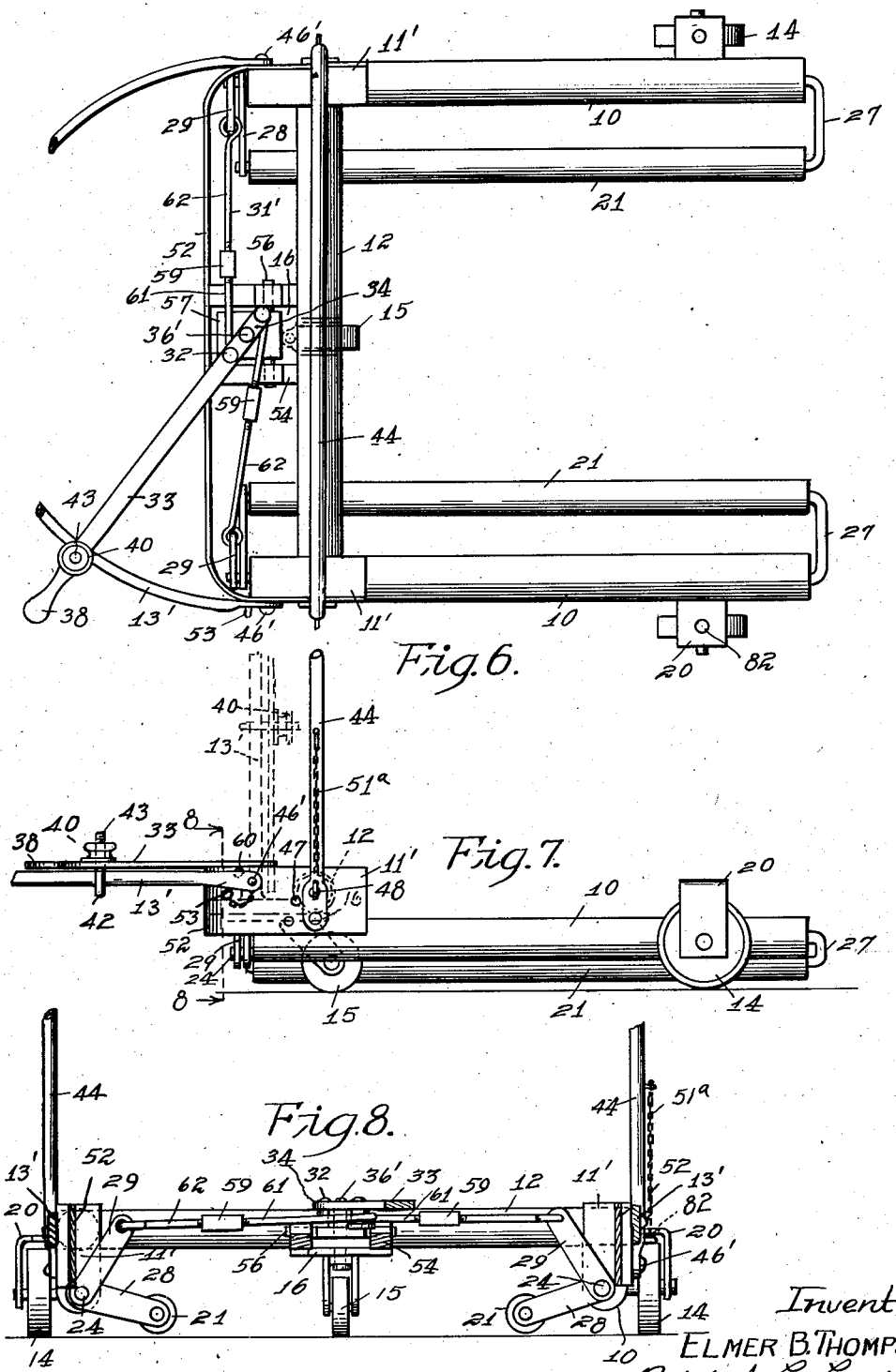
Inventor
ELMER B. THOMPSON
by Rudolph L. Lowell
Atty Patented Oct. 9, 1945

2,386,516

UNITED STATES PATENT OFFICE 2,386,516

DOLLY

Elmer B. Thompson, Des Moines, Iowa, assignor to Globe Hoist Company, Des Moines, Iowa, a corporation of Iowa Application April 27, 1944, Serial No. 533,031

9 Claims. (Cl. 254—8)

This invention relates generally to portable lifting apparatus and more particularly to a dolly adapted for lifting and supporting relatively heavy removable parts of an automobile or truck, such as the wheels, transmission, differential, torque tubes and the like.

Wheel dollies of the prior art generally comprise a horizontal frame for movably supporting a pair of spaced oppositely arranged load-carrying members, with the operating means for the load-carrying members usually being arranged in an upright plane. As a result these prior art wheel dollies are generally incapable of being used for removing parts located underneath an automobile or truck, since the vertical height of the dolly, or the vertical height of the means for operating the load-carrying members of the dolly, extend upwardly a distance which is greater than the usual ground clearance beneath an automobile.

A further objection to the prior art wheel dollies is that they are generally clumsy to operate since the load-carrying members are slowly raised and lowered by screw-jack means or the like which usually has a manually operated portion located adjacent the top of the dolly. As a result the operator of the wheel dolly is oftentimes forced to assume uncomfortable positions to concurrently accomplish a proper movement of the dolly relative to the automobile wheel or part to be removed, and an adjustment of the load-carrying members to an adjusted position relative to such part.

It is an object of this invention, therefore, to provide an improved dolly for general use in a garage or the like.

Another object of this invention is to provide an improved wheel dolly.

A further object of this invention is to provide a dolly in which all of the operating parts are located within the vertical dimension of a substantially horizontal main frame.

Another object of this invention is to provide a wheel dolly adapted to be moved underneath a truck or the like for lifting and supporting parts which are accessible only from a position beneath the truck.

A further object of this invention is to provide a wheel dolly in which a manually operated member for lifting and lowering wheel-carrying members is conveniently accessible to an operator during manipulation of the dolly into a wheel-supporting position.

Yet another object of this invention is to provide a wheel dolly in which wheel-carrying arms are adapted to be quickly and easily moved to any desired position and locked in such position.

A feature of this invention is found in the provision of a dolly comprised of a horizontal frame and a pair of oppositely spaced load-carrying members pivoted on the frame for up and down pivotal movement substantially within the vertical confines of the frame, and a manually operated handle on the frame movable in a horizontal plane to pivot the load-carrying members.

A further feature of this invention is found in the provision of a wheel dolly comprising a frame and oppositely spaced wheel-carrying arms pivoted on the frame, in which a handle for elevating and lowering the arms is movably supported adjacent one end of the frame for movement to an operating position either in a horizontal plane and extended rearwardly from the frame, or in a vertical plane adjacent the rear end of the frame.

Further objects, features and advantages of this invention will become apparent from the following description when taken in connection with the accompanying drawings in which:

Fig. 1 is a plan view of the wheel dolly of this invention, with parts broken away to more clearly show its construction;

Fig. 2 is a transverse sectional view of the dolly taken on the line 2—2 in Fig. 1;

Fig. 3 is a side elevational view of the dolly, with certain parts broken away;

Fig. 4 is a plan perspective view of an attachable supporting platform for the dolly;

Fig. 5 is a plan perspective view of another attachable supporting platform for the dolly;

Fig. 6 is a plan view, partly broken away, of a modified form of the invention;

Fig. 7 is a side elevational view, with parts broken away, of the modified form in Fig. 6; and Fig. 8 is a sectional view as seen on the line 8—8 in Fig. 7.

The wheel dolly of this invention is illustrated in the drawings as comprised of a substantially horizontal frame of a U-shape with a supporting wheel adjacent the free end of each leg, and a caster wheel arranged centrally of the closed end of the frame. A pair of spaced oppositely arranged load-carrying arms or rests are positioned between the legs of the horizontal frame, with each arm being pivotally supported on a corresponding leg for pivotal up and down movement to the inside of such leg and substantially within the vertical confines of the horizontal frame.

The load-carrying arms are concurrently raised and lowered by means including a manually operated handle pivoted adjacent one end for pivotal movement in a horizontal plane substantially centrally of a member extended between the rear ends of the legs. The free end of the handle rides on a semi-circular segment located in the plane of the horizontal frame and having its ends secured to the rear ends of the frame legs. The pivoted end of the handle is connected through lever means to rock arms mounted on the pivotal support for each of the load-carrying arms, with these arms being lowered and raised simply by moving the manually operated handle about the arcuate segment. The load-carrying arms are locked in any adjusted position by means carried on the free end of the handle and adapted for releasable locking engagement with the segment.

By virtue of this construction of the wheel dolly all of the parts are located and movable within the vertical confines of the horizontal frame. This vertical dimension of the dolly is such that it is freely movable underneath a truck or the like and operable to lift and support heavy parts which are only accessible from the bottom of the truck.

The dolly is provided with a combination handle and support which is movably carried on the frame for adjustable movement through an angle of at least 90° between horizontal and vertical positions. When the dolly is used for wheel-removing purposes the combination member is locked in a vertical position and functions as a support for the removed wheels to hold them from tipping off of the dolly. In an adjusted position away from a vertical position the combination member constitutes a handle whereby the dolly can be conveniently moved about in the manner of a push cart.

With reference to the drawings one embodiment of the dolly of this invention is illustrated in Figs. 1, 2 and 3 as including a substantially U-shaped horizontal frame having leg members 10 of a tubular construction. Adjacent the rear end of each leg 10 is a box-shaped member 11 which is welded or otherwise secured to the top of a corresponding leg member. A tubular member 12 is extended through the inner sides of the oppositely arranged box members 11 and welded to the box members to rigidly connect together the rear ends of the legs 10.

A semi-circular or segment member 13, composed of a flat metal material, is extended outwardly from the rear ends of the legs 10 with the ends of the member 13 welded to the box members 11. The frame is movably supported on a pair of front wheels 14 carried in brackets 20 oppositely arranged at the outside of the leg members 10, and a rear caster wheel 15 suspended from a plate 16 secured to the nose of the member 13 and to a member 17 extended across the member 13. The member 17 forms one side of a tool pan which includes a second side 18 and a bottom 19 connected across the member 13, with the tool pan being entirely below the top level of the member 13.

Oppositely arranged in a spaced relation between the leg members 10 are a pair of load-carrying or rest members 21 of a tubular construction. Since each assembly of a load-carrying arm 21 with a corresponding leg member 10 is the same only one of such assemblies will be referred to in detail in the following description.

The leg member 10 is provided at its opposite ends with bearing inserts 22, while bearing inserts 23 are carried at the opposite ends of the load-carrying or rest member 21 (Figs. 1 and 2).

The rest member 21 is pivotally supported on the leg member 10 by an elongated U member having one leg 24 extended through the leg member 10 and rotatably supported in the bearings 22. A second leg member 26 extends through the rest member 21 and is rotatably supported in the bearings 23. The base or connecting portion 27 of the elongated U member is located adjacent to and between the front ends of the leg member 10 and the rest member 21. The rear ends of the legs 24 and 26 of the elongated U member are extended outwardly from the rear ends of the leg member 10 and rest member 21, respectively, and rigidly connected together by a link member 28. Mounted on the leg member 24 and rearwardly of the link member 28 is a rock arm 29 which is in an angularly spaced relation with the link member 28 for a purpose to be later explained. The free end of the rock arm 29 is pivoted to one end of a lever member 31 the opposite end of which is pivoted on an upright pin 32 carried adjacent the end 34 of a handle member 33.

The pivot pins 32 for the levers 31 are longitudinally spaced on the handle 33, the end 34 of which is pivoted on an upright pin 36 located intermediate the pins 32. The pin 36 is carried in a plate member 37 welded on the tubular member 12 substantially intermediate the ends of the member 12 and extended rearwardly therefrom. The handle 33 is pivotally movable in a horizontal plane with its free end riding on top of the semi-circular member 13, and provided with a handle portion 38 extended outwardly from the member 13.

In the operation of the load-carrying or rest members 21 assume the rests 21 to be in their lowermost positions shown in Fig. 2, which corresponds to a position of the handle 33 adjacent the end 39 of the semi-circular member 13 as shown in Fig. 1. In this position of the rests 21 the links 28 are extended downwardly from the pivot legs 24 and inwardly of the frame, while the rock arms 29, which are mounted on the pivot legs 24 in an angularly spaced relation of about 90° from a corresponding link 28, are extended upwardly from a pivot leg 24 and inwardly of the frame. On movement of the handle 33 towards the end 41 of the semi-circular member 13 the rock arms 29 are concurrently moved by the levers 31 in directions away from each other to in turn pivotally move the rests 21 upwardly.

From a consideration of Fig. 2 it is seen that the free ends of the rock arms 29, during this movement of the handle 33, are moved in arcuate paths which lie in a substantially horizontal plane. As a result the levers 31 are moved in a substantially horizontal plane normal to the rock arms 29, whereby the pressure applied on the handle 33 is most effectively transmitted to the rock arms 29 for pivoting the rests 21 about the pivot legs 24.

The rests 21 are maintained in any desired elevated position by releasable locking means best shown in Fig. 3 and including a hook member 42 suspended from the free end of the handle 33 to the outside of the semi-circular member 13 adapted to engage the under side of the member 13. The shank of the hook member 42 is extended through the handle 33 and is threaded at its upper end 43 for operative engagement with a locking nut 40. On release of the nut 40 the hook member 42 is freely movable about the semi-circular member 13, with tightening of the nut 40 clamping the hook against the member 13 to lock the handle 33 at any moved position.

It is thus seen that any desired elevation of the rests 21 is simply accomplished by merely pivotally moving the handle 33 in a horizontal plane about its pivot 36, with locking of the rests 21 in an adjusted position being easily accomplished by locking means located adjacent to the grip portion 38 on the handle 33. With the arrangement of the handle 33 for operation in a horizontal plane and with the handle grip portion 38 at the rear end of the dolly any movement of the dolly concurrently with a movement of the rests 21 is conveniently accomplished without requiring the operator to assume any uncomfortable positions.

Because of the low over-all height of the wheel dolly, the movement of the rests 21 substantially within the vertical confines of the dolly, and the movement of the operating handle 33 in a horizontal plane, the dolly is able to be readily moved under an automobile or truck, and conveniently operated while below the automobile or truck, to lift and support relatively heavy mechanisms, such as the differential, transmission, torque tubes and the like.

When wheels or tires are removed from a truck and supported on a wheel dolly there is a tendency of the wheels to tip in directions forwardly and rearwardly of the dolly. To prevent this tipping action the dolly is provided with a combination handle and wheel support 44 of a substantially semi-circular shape the ends of which are pivoted at 46 on the outer sides of the box members 11. Angularly spaced about one of the pivots 46 and in a box member 11 are a plurality of openings 47 adapted for alignment with an opening 48 adjacent one end of the combination member 44. On pivotal movement of the combination member 44 about the pivots 46 the opening 48 is successively moved across the openings 47. When the combination member 44 has been moved to an adjusted position a pin 49 is inserted through the opening 48 and an aligned opening 47 to lock the member 44 in such position. The pin 49 is carried on a chain 51a secured to the combination member 44 so as to be always accessible.

In using the member 44 as a wheel support it is moved to its vertical position shown in full lines in Fig. 3 and the removed wheels are held against the member 44 by chains or the like (not shown) in a manner which is well known in the art. In the use of the wheel dolly for work underneath an automobile or truck the member 44 is moved to a horizontal position about the semi-circular member 13.

When the dolly is to be used merely as a portable truck a detachable platform 51 (Fig. 4), is supported on the top of the front wheel brackets 20 and on the top of the box members 11, as indicated by broken lines in Fig. 3. The platform 51 is illustrated as comprised of board members 75 carried on transversely extended supporting members 76 and 77 of relative thicknesses such that the top surface of the platform 51 is in a horizontal plane when member 76 is positioned on the box members 11 and the member 77 on the brackets 20. The platform is held in position on the dolly by bolts 78 projected through holes 79 in the extended end portions 81 of the transverse frame member 77 and threaded in tapped openings 82 in the front wheel brackets 20. With the platform 51 thus positioned the member 44 is moved and held in its dotted line position indicated in Fig. 3 so that the dolly is capable of being maneuvered as a push cart.

In the use of the dolly for lifting and supporting units such as the differential and transmission mechanisms from a position underneath a bus, truck or the like there is provided an attachment 63 (Fig. 5) comprised of a base member 64 of a substantially rectangular shape having a length equal substantially to the length of the rest members 21 forwardly of the frame member 12 and a width such as to be supported on the members 21 when they are in their uppermost positions.

Extended longitudinally at the bottom of the base member 64 and adjacent one side 67 is an inverted channel member 66 of a size to loosely receive a rest member 21. A flat metal supporting member 70 is extended longitudinally along the bottom of the opposite side 72 of the base member 64, with the base member being carried on and secured to the supporting member 70 and channel member 66 by countersunk screws 80. Upright supporting blocks 68 are oppositely arranged at the ends of the base member 64. Each block 68 is detachably connected with the base member 64 by bolts or the like 69 and formed with a cut away portion 71 in its top surface adapted to receive or cradle the mechanism to be removed from a truck.

The attachment 63 is positioned on the wheel dolly, as illustrated in broken lines in Fig. 2, with one of the rest members 21 within the channel member 66, and the side 72 of the base member 64 movably supported on the other rest member 21. In the raising and lowering of the rest members 21, as above described, the base member side 72 is movable relative to such other rest member 21, which is rotatable on the leg member 26, so that attachment 63 is supported in a horizontal plane for all adjusted positions of the rest members 21. It is understood, of course, that where the under portions of a vehicle are to be worked on, the vehicle is initially raised and supported on blocks or the like whereby the dolly and the attachment 63 are movable beneath the vehicle within the usual ground clearance thus provided for the vehicle.

In Figs. 6, 7 and 8 there is shown a modified form of the invention which is substantially similar to the wheel dolly illustrated in Fig. 1 except for the provision of means providing for the handle 33 being operated in either a horizontal or a vertical plane to elevate and lower the rests 21. Similar numerals of reference, therefore, will be used to designate like parts.

The dolly in Figs. 6, 7 and 8 is movably supported on front wheels 14 and a rear caster wheel 15 mounted on the plate 16 which is welded or otherwise secured to the bottom and centrally of the transverse frame member 12 and to the underside of bearing members 54.

A semi-circular member 13' is pivoted at 46' in the outer sides of the box members 11' for movement from a horizontal position, shown in full lines in Fig. 7, to a vertical position shown in dotted lines in the same figure. The outer sides of the box members 11' are formed by the bent ends of a frame member 52 which is extended transversely of the dolly rearwardly of the legs 10 and rests 21. The horizontal and vertical positions of the member 13' are defined by pins 53 insertable in openings 60 in the frame member 52. Supported between the frame member 12 and the frame member 52, in a spaced relation centrally of the dolly frame, are a pair of bearing members 54 for rotatably supporting pins 56 oppositely arranged on a plate member 57 movable between the bearing members 54. The handle 33 is pivoted on an upright pin 36' carried in the plate member 57. Levers 31' are pivotally connected between the rock arms 29 and the handle 33. Each lever 31' is comprised of two members 61 and 62 arranged end to end and having their inner adjacent ends threaded and connected together by a union coupling 59.

In the operation of the wheel dolly shown in Figs. 6, 7 and 8 the handle 33 and the member 13' can be either in their horizontal positions shown in full lines in Fig. 7 or in their vertical positions shown in dotted lines in Fig. 7. The handle 33 is movable on the member 13' to elevate and lower the rests 21 in all respects the same as was previously fully described in connection with Fig. 1. On movement of the rests 21 to an adjusted position the handle 33 is locked to the member 13' by the locking means 40—43.

With the rests in an adjusted position the member 13' and handle 33 are pivotally movable together through an angular distance of substantially 90° between vertical and horizontal positions. This pivotal movement of the handle 33 and member 13' in a vertical plane is accomplished by the pivotal support of the member 13' on the box members 11', and the pivotal support of the plate member 57 in the bearing members 54. By virtue of the threaded connection of the two members 61 and 62 of a lever member 31' by a corresponding union 59 the members 61 and 62 are relatively rotatable during the pivotal movement of the handle 33 in a vertical plane, so that this movement of the handle 33 takes place without affecting any appreciable movement of the rests 21 from a previously adjusted position. It is readily appreciated that the position of the handle 33 and member 13' to an upright position appreciably decreases the over-all length of the dolly to facilitate storage of the dolly in places where space is at a premium. The combination member 44 is pivoted on the outer sides of the box members 11' and operates in all ways similar to the combination member 44 for the wheel dolly in Fig. 1. It is apparent also that the platform 51 and attachment 63 are adapted for use with the dolly in Figs. 6, 7 and 8 in all ways similar to their application to the dolly shown in Fig. 1.

From a consideration of the above description it is seen that the invention provides an improved dolly which is flexible in application to operate as a wheel dolly, a dolly for general moving purposes, and a dolly for lifting and supporting parts from a truck or automobile which are only accessible from a position from below the automobile. The dolly is of a rugged and simple construction, and comprised of but a minimum number of movable parts which are readily operated to accomplish a quick setting and adjustment of the rests or load-carrying arms to any desired position. By virtue of the assembly and operation of the manually operated handle 33 a concurrent movement of the rest arms with a movement of the dolly is able to be conveniently and simply accomplished by the dolly operator while he is in a stooped or bent position and requiring merely a movement of his arms in a position immediately in front of him.

Although the invention has been described with respect to several preferred embodiments thereof, it is to be understood that it is not to be so limited since modifications and changes can be made therein which are within the full intended scope of this invention as defined by the appended claims.

I claim:

1. A dolly comprising a frame having a pair of spaced apart tubular frame members, a pair of tubular load-carrying members oppositely arranged between said frame members, means pivotally supporting a load-carrying member on a corresponding frame member including a U-shaped member having a leg portion extended longitudinally through each of said corresponding frame and load members, means for concurrently pivoting said load-carrying members including rock arms mounted on the leg portions extended through said frame members, a manually operated handle pivoted adjacent one end on said frame between said frame members for pivotal movement transversely of said frame, and lever members connecting the free ends of said rock arms with said handle.

2. A dolly comprising a horizontal frame having a pair of spaced apart frame members, a pair of load-carrying arms oppositely arranged between said frame members, with a load-carrying member being pivoted on an adjacent frame member for up and down pivotal movement, means for concurrently raising and lowering said load-carrying members including a manually operated handle pivoted on said frame adjacent a pair of corresponding ends of said frame members for pivotal movement transversely of said frame, means operatively connecting said handle with said load-carrying members, and a combination handle and supporting member of substantially inverted U shape having its free ends pivoted adjacent said one pair of corresponding ends of the frame members for adjustable movement between vertical and horizontal positions.

3. A dolly comprising a horizontal frame, a pair of load-carrying members pivoted on said frame for pivotal up and down movement, a supporting member rotatably mounted on said frame for rotation about an axis extended transversely of said frame, means for raising and lowering said load-carrying members including a manually operated handle pivoted adjacent one end on said supporting member, with the pivot for said handle being normal to the axis of rotation of said supporting member, means for locking said handle in a pivotally moved position to hold said load-carrying members in an adjusted position, and means operatively connecting said handle with said load-carrying members including levers extended transversely of said frame, each of said levers having one end portion rotatable relative to the other end portion thereof whereby said handle is pivotally movable with said supporting member in a vertical plane when locked to hold said load-carrying members in an adjusted position.

4. A dolly comprising a horizontal frame, a pair of oppositely spaced load-carrying members, means pivoting each of said load-carrying members on said frame for pivotal up and down movement, means for raising and lowering said load-carrying members including a manually operated handle movably supported on said frame between and adjacent the rear end portions of said load-carrying members, means supporting said handle for pivotal movement in a plane transversely of said frame to actuate said load-carrying members, and for pivotal movement about an axis extended transversely of said frame to horizontal and vertical positions, a rock arm on each of said pivoting means located rearwardly of a corresponding load-carrying member, and a pair of levers extended transversely of said frame operatively connecting said rock arms with said handle, with each of said levers having one end portion rotatable relative to the other end portion thereof.

5. A dolly comprising a horizontal frame, a pair of oppositely spaced load-carrying members pivoted on said frame for pivotal up and down movement, means for lowering and raising said load-carrying members including a manually operated handle pivoted adjacent one end between the rear end portions of said load-carrying members for pivotal movement transversely of said frame, means operatively connecting said handle with said load-carrying members, means for locking said handle member in a pivotally moved position to hold said load-carrying members in an adjusted position, and means providing for the pivotal movement of said handle between vertical and horizontal positions while locked in said pivotally moved position.

6. A dolly comprising a horizontal frame, a pair of oppositely spaced load-carrying members pivoted on said frame for pivotal up and down movement, means for lowering and raising said load-carrying members including a manually operated handle pivoted adjacent one end between the rear end portions of said load-carrying members for pivotal movement transversely of said frame, means operatively connecting said handle with said load-carrying members, and means providing for the pivotal movement of said handle between vertical and horizontal positions while in a pivotally moved position.

7. A load-supporting attachment for a dolly having a frame with a pair of spaced oppositely arranged load-carrying members movably supported thereon for concurrent up and down movement, said attachment comprising a base member, and guide means on the bottom of said base member extended longitudinally adjacent one side thereof adapted to loosely receive a load-carrying member therein, with the opposite side of said base member movably supported on the other of said load-carrying members, whereby said base member is vertically movable in a supported position on said load-carrying members on concurrent movement of said load-carrying members.

8. A dolly comprising a horizontal frame, load-carrying means movably supported on said frame for up and down movement, a supporting member rotatably mounted adjacent one end of said frame for rotation about an axis extended transversely of said frame, means for raising and lowering said load-carrying means including an operating member pivoted adjacent one end on said supporting member for pivotal movement about an axis normal to the axis of rotation of said supporting member, means operatively connecting said operating member with said load-carrying means, a handle of substantially U-shape pivoted adjacent its free ends on said one end of the frame for up and down pivotal movement, with the opposite end of said operating member, on pivotal movement of the operating member, being movable in an arcuate path defined by said handle, and means for locking said operating member with said handle, said operating member, in a locked position, being pivotally movable with said handle.

9. A dolly comprising a horizontal frame, a load-carrying means movably supported on said frame for up and down movement, means for raising and lowering said load-carrying means including a manually operated pivoted handle, means operatively connecting said handle with said load-carrying means, a pivoted supporting member pivotally carried on said frame for pivotal movement about an axis extended transversely of said frame, means pivotally supporting said handle on said supporting member for pivotal movement transversely of said frame about an axis normal to the axis of said supporting member to provide for said handle being pivotally movable in an up and down direction with said supporting member, and pivotally movable transversely of said frame independently of said supporting member to raise and lower said load-carrying means.

ELMER B. THOMPSON.